United States Patent [19]

Maske et al.

[11] 4,028,127

[45] June 7, 1977

[54] PLASTER OF PARIS USING GLYOXAL TREATED HYDROXYALKYL GUAR

[75] Inventors: Fred John Maske, St. Paul; Robert Nordgren, Minneapolis, both of Minn.

[73] Assignee: General Mills Chemicals, Inc., Minneapolis, Minn.

[22] Filed: Mar. 10, 1976

[21] Appl. No.: 665,360

[52] U.S. Cl. .............................. 106/111; 106/114
[51] Int. Cl.² .................................... C04B 11/14
[58] Field of Search .......... 106/111, 112, 113, 114, 106/115, 116

[56] References Cited

UNITED STATES PATENTS

| 163,977 | 6/1875 | Cowman et al. | 106/113 |
| 367,173 | 7/1887 | Wooster | 106/112 |
| 1,360,130 | 11/1920 | Mayer et al. | 106/113 |
| 2,362,060 | 11/1944 | Etridge et al. | 106/114 |
| 2,551,932 | 5/1951 | Dimmer | 106/114 |
| 2,965,528 | 12/1960 | Loechl | 106/114 |

*Primary Examiner*—Patrick P. Garvin
*Assistant Examiner*—John P. Sheehan
*Attorney, Agent, or Firm*—Gene O. Enockson; Patrick J. Span; Elizabeth Tweedy

[57] ABSTRACT

Patching cracks and holes with a blend of a gypsum cement and the reaction product of a hydroxyalkyl ether of guar and glyoxal.

3 Claims, No Drawings

PLASTER OF PARIS USING GLYOXAL TREATED HYDROXYALKYL GUAR

STATEMENT OF THE INVENTION

This invention relates to a composition for and a method of applying a gypsum cement to vertical or sloping porous surfaces. More particularly, this invention relates to a method of applying a gypsum cement to vertical or sloping water penetrable surfaces using a composition of certain gypsum cement and a reaction product of hydroxyalkyl ether of guar and glyoxal.

BACKGROUND OF THE INVENTION

It is desirable to patch holes and cracks in walls with gypsum cement. Heretofore there have been certain problems in applying gypsum cements to non-horizontal surfaces. When gypsum cement is mixed with water it is initially too fluid to trowel onto the non-horizontal surface. When the gypsum cement has set sufficiently to be troweled onto the non-horizontal surface the water in the mixture will "wick away" from the mixture into the porous or water wetable surface being patched. Hydroxyethyl ethers of cellulose and methylcellulose have been used with some success to thicken gypsum cement mixtures to prevent the water from "wicking away". Guar gum has been used with certain gypsum cement. The guar gum prevented "wicking away" but also flocculated the gypsum cements thus producing a weak set. Hydroxyalkyl ethers of guar have been mixed with plaster of paris. While the hydroxyalkyl ethers of guar do not flocculate the gypsum cement as does guar gum, the hydroxyalkyl ethers of guar thickens so rapidly the gypsum cement cannot fully wet out before the thickening occurs. This feature results in producing a poor final set.

SUMMARY OF THE INVENTION

According to the present invention a dry blend of certain gypsum cements and a reaction product of hydroxyalkyl ether of guar and glyoxal, when mixed with water have the properties particularly adapted for application of the mixture to non-horizontal surfaces. The reaction product of hydroxyalkyl ether of guar and glyoxal attributes sufficient water retention to prevent "wicking off" into porous or water penetrable substrate for surface, i.e. plaster, wood or paper. In addition, it hydrates and thickens slowly enough that the gypsum cement itself will "wet out" and reach a condition from which it can convert to a good set.

Gypsum cement is defined by "The Condensed Chemical Dictionary", Sixth Edition, 1956, Rheinhold Publishing Company, page 556 as follows:
"A group of cements which consist essentially of calcium sulfate and are produced by the complete or partial dehydration of gypsum $CaSO_4 \cdot 2H_2O$. They usually contain additions of various sorts, these additions causing the differentiation of various special names. For example Keene's cement contains alum or aluminum sulfate, Mack's cement contains potassium carbonate and Parian cement contains borax."

Plaster of paris is included by name among gypsum cements. It is well known that borax cross-links guar gum and its derivatives to form gels at pH levels above about 7. The gypsum cements useful in the practice of this invention are those which are guar non-cross linking gypsum cements. Namely these are gypsum cements which do not contain borax and those that contain borax and are used in plaster systems having pH levels below about 7. Among those not containing borax are plaster of paris, Keene's cement, Mack's cement and Martin's cement. Parian cement can be used in plaster systems having pH levels below about 7.

Hydroxyalkyl ethers of guar useful in the practice of this invention are those wherein the hydroxyalkyl group contains 2 to 4 carbon atoms and include hydroxyalkyl guar, hydroxypropyl guar and hydroxybutyl guar. The reaction product of hydroxyalkyl ether of guar and glyoxal is used in amounts of about 0.2 to 3.0% by weight based upon the weight of the dry blend of the gypsum cement and the reaction product. The amount of glyoxal reacted with the hydroxyalkyl ether of guar is about 0.01 to 1.5% by weight of the hydroxyalkyl ether of guar. The pH range is usually about 5.0 to 9.0. The lower part of the glyoxal-hydroxyalkyl ether of guar range from about 0.01 to about 0.5% is usually used with lower pH plaster systems for example in the pH range of about 5.0 to 7.0. The higher glyoxal-hydroxyalkyl ether of guar range, about 0.5 to 1.5%, is usually used with higher pH plaster systems for example about 6.0 to 9.0.

DETAILS OF THE INVENTION

The hydroxyalkyl ether of guar gum used in the blend of the present invention can be made by reacting guar gum with alkylene oxide in the presence of an alkaline catalyst. The alkylene oxide forms an ether linkage with a hydroxyl group of the guar gum. In guar gum each saccharide ring has an average of three hydroxyl groups with which the alkylene oxide can react. The degree of substitution of the hydroxyalkyl ether group is defined as oxirane equivalents of alkylene oxide per anhydrohexose unit of guar gum. The degree of substitution generally useful in the practice of this invention is about 0.2 to 1.2. Hydroxyalkyl ethers of guar gum that can be used in the practice of this invention are those derived from reacting an alkylene oxide containing two to four carbon atoms, namely ethylene oxide, propylene oxide and butylene oxide. 1,2-Butylene oxide is a common commercial chemical. 2,3-Butylene oxide is generally present in crude mixtures with 1,2-butylene oxide.

In order for the reaction between the guar gum and the alkylene oxide to proceed, the presence of an alkaline catalyst is necessary. Such catalysts are in general the alkali metal or alkaline earth metal hydroxides such as sodium, potassium or calcium hydroxide. Ammonia may also be used, as well as more complex basic catalysts such as benzyl trimethyl ammonium hydroxide. No special advantage, however, is obtained by the use of more exotic basic or alkaline catalysts over the use of sodium hydroxide which is commonly available.

Very small amounts of catalyst may be employed, as low as 0.05 percent based on the weight of the guar gum. It is generally not necessary to exceed 10 percent by weight of the guar gum, although larger amounts might be used. In general, about 2 percent to 3 percent catalyst by weight of the guar gum is employed.

The reaction can be conducted at room temperature or elevated temperatures. The temperature range in which the reaction is generally conducted is about 17° C. to about 100° C. While higher temperatures can be used, such as up to 125° C., there is generally no advantage achieved.

The reaction can be conducted at atmospheric temperature, under reflux, or at elevated pressures in a closed reactor. The exact pressure is not critical and while higher pressure may be employed, operation is normally conducted at whatever pressure develops during the reaction. Generally such autogenous pressures will be on the order of from about 30 to 125 p.s.i.g.

The reaction may be conducted in the substantial absence of water or solvent (no water added) although the efficiency of the reaction is very low without the addition of water. Accordingly, the reaction is generally conducted in the presence of water to provide higher reaction efficiency. In the absence of other solvents, catalytic amounts of water on the order of about 3 to 8 percent by weight based on the guar gum are employed. These small amounts are generally used where higher temperatures and elevated pressures are employed, whereas larger amounts of water are used when lower temperatures and atmospheric pressure are employed. Further, other organic solvents either water-miscible or water-immiscible organic solvents are isopropanol (water-miscible) and heptane (water-immiscible). Other unreactive organic solvents may be employed although the two mentioned are preferred. Such other organic solvents are the common aliphatic hydrocarbons having from five to ten carbon atoms which are commercially available such as heptane and hexane. Alcohols higher than methanol, those having from two to six carbon atoms, may be employed also such as t-butanol, the only requirement being that the solvent be substantially unreactive. Where higher water levels are employed, the water should be sufficient to swell the guar gums slightly, thereby making the gum more reactive. When employed with a solvent, such as isopropanol or heptane, from about 10 to 80 percent water based on the weight of guar gum, is employed. The preferred amount of water is about 30 to 70 percent with the water-miscible solvents and about 20 to 30 percent with the water-immiscible solvents.

Where organic solvents are employed, they are generally present in an amount up to eight times the amount of gum by weight, although larger amounts may be employed if desired. Generally, with water-miscible solvents, an amount equal to one to three times the weight of gum is employed. With water-immiscible solvents, an amount of from three to five times the weight of gum is generally employed. With the organic solvents, the ratio by weight of water to organic solvent is preferably within the range of about 0.05 to 0.5. A range of 0.2 to 0.45 is preferred with the water-miscible organic solvents and from about 0.1 to 0.2 is preferred with the water-immiscible organic solvents. In general, any unreactive organic solvent may be employed. With the lower ratios of water to organic solvent, the reaction is slower. With the higher ratios, the recovery of product by filtration is slowed.

The reaction product of hydroxyalkyl ether of guar and glyoxal can be made according to the following procedure. The hydroxyalkyl ether of guar was dispersed in a water-solvent media such as 25 parts water and 75 parts isopropanol. The pH of the dispersion was adjusted to about 6.0 to 6.3. The glyoxal was added to the mixture. The mixture was then stirred for a period of between about 10 to 30 minutes, preferably about 15 to 25 minutes, at a temperature of about 40° to 50° C. The mixture was then filtered, dried at a temperature of about 60° C. to 80° C. and ground to pass a 50 mesh screen, U.S. Standard Sieve.

The reaction product prepared by the above procedure is dry blended with a gypsum cement to produce the blends used in the practice of this invention. The blends are used by mixing with water in an amount generally of about 30 to 50% water by weight based upon the total weight of the mixture. The reaction product of the hydroxyalkyl ether of guar and glyoxal will begin to develop substantial viscosities after a period of about 4 to 8 minutes. The delayed development of viscosity permits the gysum cement to wet adequately to produce a final strong set. The development of high viscosity after the wetting period permits the trowling of the gypsum cement onto non-horizontal surfaces as well as horizontal surfaces. In addition the viscosity produced by the reaction product prevents wicking away of the water during the setting period.

Set out below in Series 1 are specific illustrations of the thickening properties of the reaction product of hydroxypropyl guar and glyoxal prepared as described above. Plaster of paris is generally used at a pH between 5.5 and 8.8. Therefore the hydration rate of the reaction product was measured in a 0.1N sodium bicarbonate solution having a pH of 8.25. The hydration rate was measured for illustration purposes in sodium bicarbonate solution rather than gypsum cement to avoid distortion of the measurements due to the setting of the plaster mix. The measurements shown below were made using samples having a reaction product concentration of 5% by weight in the sodium bicarbonate solution which is the inventors' standard laboratory method of obtaining comparison viscosity data. It should be noted that the amount of the reaction product of hydroxyalkyl ether of guar and glyoxal useful in the practice of this invention is about 0.2 to 3.0% by weight based upon the weight of the dry blend of the gypsum cement and the reaction product. The hydration rates were measured by dispersing five grams of the dried reaction product in 495 grams of 0.1N sodium bicarbonate solution in a Waring Blendor at slow speeds for a period of 60 seconds. Thereafter, viscosities of the samples were measured at a temperature of 25° C. (±.5°) with a Brookfield Viscometer equipped with a Number 2 spindle for viscosity measurements below 2000 centipoise and a Number 3 spindle for viscosity measurements for above 2000 centipoise. The spindles were rotated at 20 r.p.m.

| | Series 1 | | |
|---|---|---|---|
| | Reaction Product Composition % By Weight | | |
| Sample | 1 | 2 | 3 |
| Hydroxypropyl guar | 99.5 | 99.0 | 98.5 |
| Glyoxal | 0.5 | 1.0 | 1.5 |
| | Viscosity Measurements (centipoise) | | |
| Sample | 1 | 2 | 3 |
| Time Period | | | |
| 2 Min. Visc: | 120 | 20 | 10 |
| 3 Min. Visc: | 700 | 60 | 30 |
| 4 Min. Visc: | 1380 | 340 | 80 |
| 5 Min. Visc: | 1760 | 800 | 250 |
| 6 Min. Visc: | 1940 | 1220 | 660 |
| 7 Min. Visc: | 2150 | 1520 | 830 |
| 8 Min. Visc: | — | — | 1240 |
| 9 Min. Visc: | 2300 | 1760 | 1460 |
| 10 Min. Visc: | 2350 | 1820 | 1680 |
| 15 Min. Visc: | 2375 | 2075 | 1930 |
| 60 Min. Visc: | 2300 | 2050 | 2100 |
| pH of Sample | 8.25 | 8.25 | 8.30 |

A further illustration of the hydration properties of the reaction products of hydroxypropyl guar and glyoxal are shown in Series 2. The reaction products shown below were made and their viscosities measured as described above. The results are reported in terms of percentage of the ultimate viscosity developed by the reaction product at given periods of time after mixing with 0.1N sodium bicarbonate solution as described above.

Series 2
Reaction Product Composition % By Weight

| Sample | Hydroxypropyl Guar | Glyoxal |
|---|---|---|
| 1 | 100 | 0 |
| 2 | 99.9 | 0.1 |
| 3 | 99.5 | 0.5 |
| 4 | 99.0 | 1.0 |
| 5 | 98.5 | 1.5 |
| 6 | 98.0 | 2.0 |

Viscosity Measurements (pH = 8.3 – 8.6)

| Sample | 1 | 2 | 3 | 4 | 5 | 6 |
|---|---|---|---|---|---|---|
| Time Period | | | | | | |
| 2 min. | 43% | 28% | 5% | 1% | 0.5% | 0% |
| 3 min. | 69 | 61 | 29 | 2.9 | 1.3 | — |
| 4 min. | 82 | 77 | 58 | 16.5 | 3.9 | — |
| 5 min. | 88 | 88 | 74 | 39 | 12.2 | — |
| 6 min. | 94 | 93 | 82 | 59 | 32 | 4 |
| 7 min. | 98 | 96 | 90 | 73 | 40 | 8 |
| 8 min. | 99 | 98 | — | — | 60 | 17 |
| 9 min. | 100 | 99 | 97 | 85 | 71 | 26 |
| 10 min. | | 100 | 99 | 88 | 82 | 31 |
| 11 min. | | | — | — | — | 36 |
| 12 min. | | | — | — | — | 40 |
| 13 min. | | | — | — | — | — |
| 14 min. | | | | | | 47 |
| 15 min. | | | 100 | 100 | 94 | 51 |
| 20 min. | | | | | — | 61 |
| 30 min. | | | | | — | 70 |
| 40 min. | | | | | — | 78 |
| 60 min. | | | | | 100 | 81 |
| 120 min. | | | | | | 92 |
| 180 min. | | | | | | 95 |
| 300 min. | | | | | | 100 |

The embodiments of the invention in which an exclusive property or privilege is claimed are defined as follows:

1. A blend consisting essentially of as the first component a reaction product of hydroxyalkyl ether of guar and glyoxal, wherein the hydroxyalkyl group of the hydroxyalkyl ether of guar contains from 2 to 4 carbon atoms, and the amount of glyoxal reacted with the hydroxyalkyl ether of guar is about 0.01 to 1.5% by weight of the hydroxyalkyl ether of guar, said reaction being conducted at a pH of about 6.0 to 6.3 in a water-solvent media; said reaction product being in an amount of about 0.2 to 3.0% by weight of the total blend; and, as the second component a non-guar crosslinking gypsum cement.

2. The blend of claim 1 wherein the amount of glyoxal reacted with the hydroxyalkyl ether of guar is about 0.5 to 1.5% by weight of the hydroxyalkyl ether of guar.

3. A method of applying gypsum cement to non-horizontal water penetrable surfaces whereby a blend consisting essentially of as the first component a reaction product of hydroxyalkyl ether of guar and glyoxal wherein the hydroxyalkyl group of the hydroxyalkyl ether of guar contains from 2 to 4 carbon atoms, and the amount of glyoxal reacted with the hydroxyalkyl ether of guar is about 0.01 to 1.5% by weight of the hydroxyalkyl ether of guar, said reaction being conducted at a pH of about 6.0 to 6.3 in a water-solvent media; said reaction product being in an amount of about 0.2 to 3.0% by weight of the total blend; and, as the second component a non-guar crosslinking gypsum cement, is mixed with water to form a trowlable mixture and applied to said non-horizontal water penetrable surface.

* * * * *

UNITED STATES PATENT AND TRADEMARK OFFICE
CERTIFICATE OF CORRECTION

PATENT NO. : 4,028,127
DATED : June 7, 1977
INVENTOR(S) : Fred John Maske, and Robert Nordgren It is certified that error appears in the above-identified patent and that said Letters Patent are hereby corrected as shown below:

Column 2, line 10 "hydroxyalkyl" should read
--hydroxyethyl--

Column 4, line 19 insert --" "--before and after wicking away.

Signed and Sealed this

Thirteenth Day of September 1977

[SEAL]

Attest:

RUTH C. MASON
Attesting Officer

LUTRELLE F. PARKER
Acting Commissioner of Patents and Trademarks